(No Model.)
J. J. GREEN.
PROCESS OF AND APPARATUS FOR REMOVING FIBER FROM COTTON SEED.
No. 307,190. Patented Oct. 28, 1884.
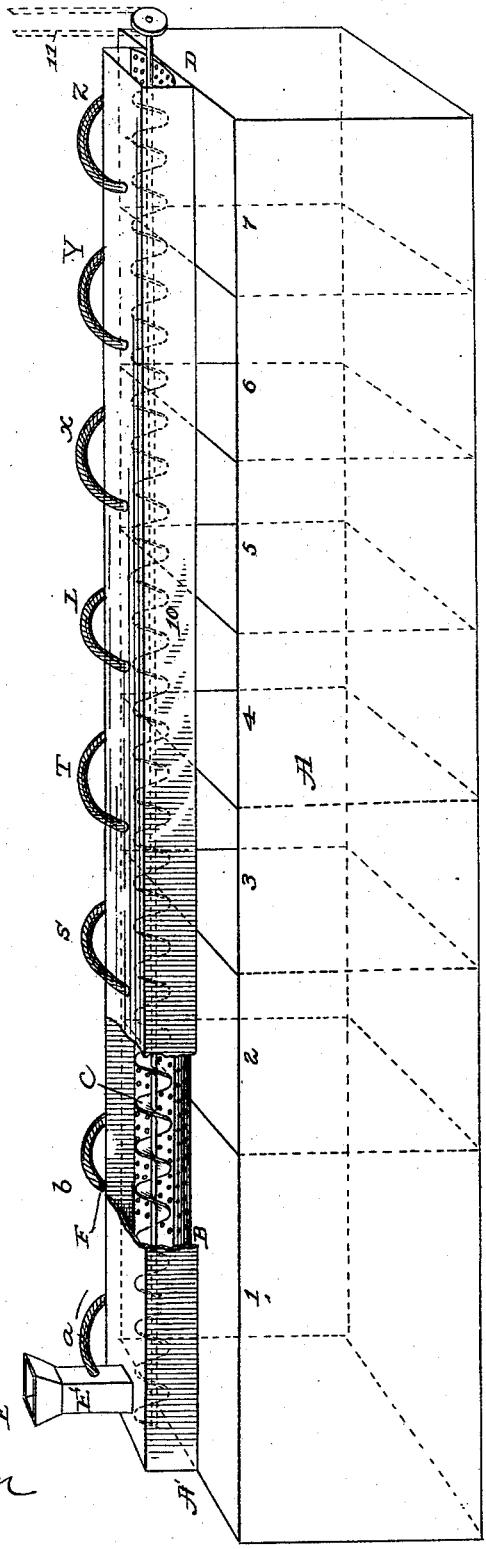

UNITED STATES PATENT OFFICE.

JOSHUA J. GREEN, OF JACKSON, MISSISSIPPI, ASSIGNOR TO THE UNITED STATES COTTON SEED CLEANING COMPANY, OF NEW YORK, N. Y.

PROCESS OF AND APPARATUS FOR REMOVING FIBER FROM COTTON-SEED.

SPECIFICATION forming part of Letters Patent No. 307,190, dated October 28, 1884.

Application filed January 12, 1884. (No model.)

*To all whom it may concern:*

Be it known that I, JOSHUA J. GREEN, of Jackson, in the county of Hinds and State of Mississippi, have invented a new and useful Improvement in Treatment of Cotton-Seed; and I do hereby declare that the following is a full, clear, and exact description of the same.

My invention relates to the treatment of cotton-seed for the removal of the fiber from the seed.

It consists in a mode of operation carried on by mechanism, and in mechanism specially designed for the purpose, all as hereinafter fully set forth.

Heretofore cotton-seed, as it comes from the gin with its adhering fiber, has been treated with sulphuric acid for the removal of the fiber by dipping the seed in acid, and afterward washing the seed for the removal and saving of the acid, or part of the acid, adhering to the seed. In my process and apparatus I contemplate the more complete saving of the acid, and, in addition, preservation of the burned fiber for the purpose of fertilizer.

In carrying out my invention I have devised and used an improved apparatus shown in the accompanying drawing, in which the sole figure represents a vertical longitudinal section of the apparatus.

In this drawing, A represents a box containing a series of tanks, which tanks are numbered, respectively, 1 2 3, &c. They are made of or lined with material suited to resist the action of the acid or other liquid to be used therein, and may be in number as many as may be required for the purpose hereinafter explained. They may be of wood lined with lead, of enameled iron, or of lead, and are placed in the order shown contiguous to each other. Over them is placed a trough or tube, 10, of lead, porcelain, or any other suitable material. It extends the whole length of the tank, and from the point A' to the point B is solid, so as not to allow the liquid used to pass through to the tank below. From the point B to the end D it is perforated, and this latter part allows the liquid to drain off to the tanks. I may use gutter-bottoms to collect the liquid falling from the conveyer and conduct it back to the tank from which it was drawn. In this trough or tube I place a screw-conveyer, C, of lead, copper, glass, or any other suitable material, and of ordinary form, such as is used to convey grain. Its shaft turns in suitable bearing, and is driven by a belt, 11, or any suitable gearing or other device, so that the conveyer may move the seed continually from the end A to the end D. At the end A is a spout, E', with a flaring mouth, E, into which the seed is poured to pass to the trough.

From each of the tanks 2 3, &c., rises a pipe, S T, &c., respectively, these pipes leading from pumps that draw liquid from the respective tanks, and opening over the conveyer-trough above the tanks from which the liquid they discharge was drawn. The pipes are provined with any suitable pumps (not shown) driven by any suitable power, whereby the liquid is pumped from the tanks. Each pipe draws from and discharges over the same tank, and preferably discharges near that edge of the tank from which the seed is moving.

In order to have the acid act more effectively on the seed, I prefer to pass a pipe, a, from tank 1 into the spout E', to saturate the seed near the entrance. A second pipe, b, from this tank bends over the rear or left-hand portion of the same tank. The working is as follows: Seed are delivered into the conveyer at E, and acid is pumped or elevated from tank 1 into conveyer-tube at E'. The screw-conveyer bears both seed and acid along over its closed bottom toward D, agitating them the while, and when the point B is reached the acid runs back into tank 1, from which it was drawn, either directly or through gutters, as above described. The lint is all now burned on the seed, but clings to them in a gummy mass, and to recover the acid from this mass and at the same time put the charred lint into acid-tank, another stream of acid, drawn from tank 1, is driven on the seed at F. This forces acid and charred material from the seed, and both drop through the perforated bottom of the conveyer and return to tank 1, where a steam-coil in the tank forces the charred lint to the surface, from which it can be skimmed and pressed to further recover what acid it holds, and the acid in tank 1 can thus be used over and over again, and is caused to become stronger, owing to the heat, thus allowing a lower degree of acid to be used. Twenty feet (more or less) of the conveyer and its tube can be devoted to each bath, either over each tank or gutters, as before described. Tanks 2, 3, 4, and 5 are filled with water when the operation commences. At S a stream drawn from tank 2 is driven on the seed as they are borne along by conveyer. This stream washes the acid from the seed, and also most of the charred lint that is still on them, and runs back through perforations into tank 2, to be used again. The liquid in this tank is originally water, but, by being used over and over again to wash acid from the seed, it gradually becomes stronger and stronger with acid till it shows 45° Baumé, when a portion of the contents of tank 2 is transferred to tank 1, to dilute the stronger acid that must be now and then added to tank 1 to make good the loss of volume removed on the seed and washed off in tank 2. This mixture of strong acid—66° with the 45°—from tank 2 makes acid of proper strength for cleaning the seeds when it is heated as above described. From pipe T a stream drawn from tank 3 is driven on the seed, washing off the 45° acid with which they have been wetted at S, and returns through perforations to its tank, No. 3. Being used to wash off only 45° acid, the liquid in this tank rises to density of about 35° in the same time that tank 2 reaches 45°; and when part of contents of tanks 2 is transferred to tank 1 part of contents of tank 3 is transferred to tank 2, thus reducing its density. Similarly, streams are driven on the seed at L and X from tanks 4 and 5, washing off successively 35° acid at L and 20° acid at X. Thus tanks 2, 3, 4, and 5, starting as water, become successively 45°, 35° 20°, and 5° stronger with acid, or more or less, as desired. Tank 1 is renewed by new 66° acid and part of contents of tank 2. Tank 2's volume is made good from tank 3, tank 3 from tank 4, and tank 4 from tank 5. The volume in tank 5 is kept up by adding fresh water. Therefore, in working no acid is lost except the 5° with which the seed are wet when they pass from tank 5, all being transferred forward step by step till it finally reaches tank 1 and becomes working-acid. At pipe Y a stream of weak alkali drawn from tank 6 is similarly driven on the seed, and neutralizes what acid still clings to it, and flows back into its tank 6, to be used again. At pipe Z the seed is lastly washed with water from tank 7, which returns to its tank same as the others, and leaves the seed clean of charred lint, acid, and alkali. The cleaning process is now finished, the seed leave the conveyer at D and pass into a drier.

I do not confine myself to special mechanism shown in carrying on the process, the essential features of said process being the washing of the seed by repeatedly pouring liquid upon it as it is moved in a trough, and allowing said liquid, after washing the seed, to run back again into the tank from which it was drawn.

For continuous day and night working a duplicate set of tank is necessary, so that while one set is in use the other, being quiet, can be relieved of the charred material that has been washed into it and be again ready for use.

I claim as my invention—

1. The hereinbefore-described method of treating the fiber of cotton-seed, consisting in passing it over a series of tanks, the first containing acid and the others water or diluted acid, in causing the acid to pass from the acid-tank down through the seed, and thus burning the fiber, in causing a second stream of acid to wash off the burned fiber, then conveying it and the burned fiber back to the acid-tank, heating said tank, and skimming off the said burned fiber, all substantially as described.

2. The hereinbefore-described apparatus, consisting of a series of tanks, a perforated trough, a conveyer over said trough, pipes and suitable pumping apparatus for pumping the liquids from tanks to the parts of the conveyer over said tanks, all substantially as described.

3. In combination, the box A, having series of tanks 1 2 3, &c., the conveyer-trough, solid over part of tank and perforated over tanks 2 3 4, &c., the conveyer C, suitable pumps, and driving apparatus, all substantially as described.

In testimony whereof I have signed my name to this specification in the presence of two subscribing witnesses.

JOSHUA J. GREEN.

Witnesses:
JESSE BARR,
A. M. NELSON, Jr.